United States Patent Office 3,543,074
Patented Nov. 24, 1970

3,543,074
CATHODOLUMINESCENT GLASSES AND CATHODE RAY TUBES EMPLOYING SAME AS THE TARGET
Warren H. Turner, Toledo, Ohio, and Marvin J. Albinak, Lutherville, Md., assignors to Owens-Illinois, Inc., a corporation of Ohio
No Drawing. Continuation-in-part of application Ser. No. 395,937, Sept. 11, 1964. This application Aug. 14, 1968, Ser. No. 752,495
Int. Cl. C03c 3/28; C09k 1/04
U.S. Cl. 313—92                              13 Claims

ABSTRACT OF THE DISCLOSURE

Glasses characterized by a high level of cathodoluminescence, using copper as the cathodoluminescent activator, in solution form, as distinguished from a dispersed crystalline phase, in combination with a particular group of glass-forming materials (alkaline earth metal oxides, silica, alumina alkali metal oxides). The glasses are highly resistant to deterioration against electron bombardment and upon excitation have emissions within the ultraviolet to blue region of the spectrum.

RELATED CASE(S)

This case is a continuation-in-part of copending U.S. patent application Ser. No. 395,937, filed Sept. 11, 1964, now abandoned.

THE INVENTION

This invention relates to glass compositions, and more particularly to cathodoluminescent glasses that are characterized by suitability for visual use and have physical properties rendering them capable of incorporation into cathoderay tubes as viewing screens. Still further, the invention relates to cathodoluminescent glasses that are also unexpectedly good absorbers for ultraviolet rays and for X-rays.

The cathode-ray tube industry has been hampered by a very pressing problem, to wit, the cost of phosphors and difficuties of use. The phosphors are used as coatings on the inner surfaces of cathode-ray tube viewing screens. When these are bombarded with an electron beam, a visual image is produced. Although the phosphors are capable of producing satisfactory visual images under some conditions, they are costly and otherwise disadvantageous because of the following reasons.

(1) The phosphors are tremendously sensitive to impurities. As a result, they are expensive to produce because of the care and precision required during their manufacture to both remove impurities and then to keep impurities out during subsequent shipment to the user.

(2) Phosphors are conventionally coated on the inner face of the viewing screen of a cathode-ray tube. If, at any point during the production and coating of cathode-ray tubes, impurities are accidentally introduced into the phosphors, the cathodoluminescence will be greatly reduced.

(3) *Resolution.*—The particle size of the phosphor crystals in the coatings of cathode-ray tubes determines the degree of resolution of the image produced by the tube. Obviously, the physical comminution of phosphor crystals cannot produce particles as small as the electrons in the beam used to bombard the coatings to produce the image. Therefore, the resolution of present-day cathode-ray tubes is not nearly as good as it could be if the luminescent agent were theoretically of electron particle size.

(4) *Contrast.*—A phosphor coating on the rear surface of the faceplate of a cathode-ray tube functions as a reflector of ambient light. Thus, ambient light striking the outer surface of the faceplate is largely reflected back to the eye of the viewer. This light often approaches the intensity of the brightest portion of the image produced by the tube. The result is that the darker portions of the image are washed out and the contrast between the darkest and brightest portions of the image is greatly reduced.

If it were possible for the viewing face to be entirely transparent, and at the same time of a luminescent character, the picture contrast would be greatly improved because the ambient light would pass through the viewing face of the tube and be caught by the coatings on the inner walls of the tube, rather than be reflected to reduce contrast.

(5) *Radiation absorption.*—Cathode-ray tubes of modest power, typified by present-day black and white television screens, emit relatively low levels of ultraviolet rays. However, if these could be absorbed, a more normal threshold of vision could be maintained.

As the power output of cathode-ray tubes increases, as in color television screens, X-ray emission increases. There is concern in the industry that a harmful level is being approached. Therefore, if the faceplate could be X-ray absorbent, with retained good image production, a substantial advance would be provided to the art.

In view of the foregoing, it will be evident that a substantial advance would be provided to the art by a glass for cathode-ray tube faceplates, having the following characteristics:

(A) Cathodoluminescent, so that phosphors with their inherent problems would be eliminated;
(B) Improved image resolution by the fact that a vitreous phase with theoretical electron particle size definition, would function as the luminescent agent;
(C) Long life;
(D) Absorbent for ultraviolet rays to provide a normal threshold of vision; and absorbent for X-rays to eliminate danger to human observers of cathode-ray tubes;
(E) Transparent, for improved image contrast under high ambient light conditions; and
(F) Short image decay time.

In accordance with this invention there are prepared novel glasses having some or all of the foregoing characteristics. One unique contribution provided by the present invention, makes it possible to produce cathode-ray tubes wherein the viewing face itself is the luminescent medium, and totally transparent for improved image contrast.

More particularly, in accordance with this invention, there is prepared a novel glass having a high level of cathodoluminescence wherein copper is used as the dopant or cathodoluminescent activator and wherein:

(1) The copper is present in a glass solution form, as distinguished from a dispersed crystal phase, and in a specific range for optimum cathodoluminescence; and
(2) The copper is present in the oxide state, in combination with a particular group of glass-forming materials, namely the alkaline-earth metal oxides.

The overall compositional range of glasses encompassed within the total scope of the present invention is summarized in Table I hereinafter. The detailed compositions of a number of glasses from which the compositional summary of Table I was developed, are set forth in the Examples I to Va following Table I. Cathodoluminescent data plus other observations of the various glasses are also shown in the Examples.

TABLE I.—COMPOSITIONAL RANGE

| Component: | Batch Parts by Weight | |
|---|---|---|
| | Broad | Preferred |
| $SiO_2$ | 35–70 | 40–60 |
| $Al_2O_3$ | 8–25 | 15–20 |
| RO (MgO, CaO, SrO, BaO) | 15–50 | 18–30 |
| $R_2O$ ($Li_2O$, $Na_2O$, $K_2O$, $Rb_2O$, $Cs_2O$) | 0.1–5.0 | 0.1–3.0 |
| CuO | 0.2–1.0 | 0.5–0.8 |

Relative to the above compositional range, it is to be noted that a rather high content of $SiO_2+Al_2O_3$ is desirable. This factor is limited only by melting properties of the glass. The lower limit is, in general, set by the devitrification levels.

The following examples typify glasses made in accordance with the present invention. The compositional ranges set forth above are substantiated by these examples. Further ramifications will become apparent to those skilled in the art, within the scope of the invention.

The various ramifications of the invention can be broken down into categories, based upon the alkaline earth metal oxide component predominating in the glass. The following discussion will highlight the various aspects and extended scope of the invention.

Example I.—Magnesium aluminosilicates: RO=MgO

The base glass used in this series of runs was a magnesium aluminosilicate of the following batch composition:

| Component: | Parts by weight |
|---|---|
| $SiO_2$ | 61.0 |
| $Al_2O_3$ | 18.5 |
| MgO | 20.5 |

Varying amounts of CuO, illustrating the range of the present invention, were added to the base glass composition to provide the luminescent output results shown hereinafter. Each of the glasses 1 to 10 was melted at a temperature of 2850° to 2900° F. and maintained at such melting temperature until all of the ingredients had gone into solution and there resulted a substantially homogeneous, bubble free glass. Each glass was then rapidly cooled so as to prevent crystallization by pouring melt onto a cold iron slab. Each resulting cooled glass was then annealed to relieve stress.

| Glass No.: | Parts, CuO | Luminescent output, 20 kv., 200 μa./in.² | Luminescent output, 25 kv., 400 μa./in.² | Color |
|---|---|---|---|---|
| 1 | 0.51 | 100 | 300 | Blue. |
| 2 | 0.20 | 81 | | Do. |
| 3 | 0.30 | 115 | | Do. |
| 4 | 0.40 | 132 | | Do. |
| 5 | 0.50 | 110 | | Do. |
| 6 | 0.40 | 155 | | Do. |
| 7 | 0.40 | 174 | | Do. |
| 8 | 0.40 | 185 | | Do. |
| 9 | 0.40 | 150 | | Do. |
| 10 | 0.50 | 188 | 390 | Do. |

Example Ia.—Magnesium aluminosilicate modifications

The following data are based upon modifications made to the base glass composition employed above. These data illustrate that when small amounts of alkali metal oxides are added, the 200 μa. output of glass based on MgO alone as the RO component is subdued from a level generally exceeding 100 to a level generally below 100. Each of the glasses 11 to 14 was melted at a temperature of 2700° to 2750° F. and maintained at such melting temperature until all of the ingredients had gone into solution and there resulted a substantially homogeneous bubble free glass. Each glass was then rapidly cooled so as to prevent crystallization by pouring the melt onto a cold iron slab. Each resulting cooled glass was then annealed to relieve stress.

| Glass No.: | Parts, CuO | Parts $R_2O$ | Luminescent output, 20 kv., 200 μa./in.² | Luminescent output, 25 kv., 400 μa./in.² | Color |
|---|---|---|---|---|---|
| 11 | 0.50 | 5 $Li_2O$ | 64 | 184 | Blue. |
| 12 | 0.40 | 5 $K_2O$ | 70 | 200 | Do. |
| 13 | 0.40 | 5 $Rb_2O$ | 85 | 200 | Do. |
| 14 | 0.40 | 5 $Cs_2O$ | 80 | 200 | Do. |

Example II.—Calcium-magnesium aluminosilicates:

$$RO = CaO + MgO$$

In this series of runs, the base glasses contained both CaO and MgO as the RO component. The following tabulation illustrates the glass compositions, and luminescent output, with CuO present within the range of the present invention.

Each of the glasses 15 to 17 was melted at a temperature o fabout 2900° F. and was maintained at such melting temperature until all of the ingredients had gone into solution and there resulted a substantially homogeneous, bubble free glass. Each glass was then rapidly cooled so as to prevent crystallization by pouring the melt onto a cold iron slab. Each resulting cooled glass was then annealed to relieve stress.

| Ingredient: | Batch Parts | | |
|---|---|---|---|
| | Glass No. 15 | Glass No. 16 | Glass No. 17 |
| $SiO_2$ | 58.9 | 60.4 | 59.6 |
| $Al_2O_3$ | 17.9 | 18.3 | 18.1 |
| MgO | 9.7 | 16.8 | 13.2 |
| CaO | 13.5 | 4.5 | 8.8 |
| CuO | 0.5 | 0.5 | 0.5 |
| Luminescent output, 20 kv., 200 μa./in.² | 112 | 175 | 185 |
| Luminescent output, 25 kv., 400 μa./in.² | 265 | 430 | 420 |
| Color | Blue | Blue | Blue |

Example IIa.—Calcium-magnesium aluminosilicate modification

The following data are based upon a modification made to a Ca—Mg aluminosilicate glass similar to those employed above. The modification was effected by the addition of a small amount of alkali metal oxides. This facilitated fusion of the glass. Glass No. 18 was melted at a temperature of about 2850° F. and was maintained at such melting temperature until all of the ingredients had gone into solution and there resulted a substantially homogeneous bubble free glass. The glass was then rapidly cooled so as to prevent crystallization by pouring the melt onto a cold iron slab. The cooled glass was then annealed to relieve stress.

BATCH PARTS

| Ingredient: | Glass No. 18 |
|---|---|
| $SiO_2$ | 63.6 |
| $Al_2O_3$ | 12.8 |
| CaO | 12.8 |
| MgO | 7.4 |
| $Na_2O$ | 4.1 |
| $K_2O$ | 0.1 |
| CuO | 0.5 |
| Luminescent output, 20 kv., 200 $\mu a./in.^2$ | 130 |
| Luminescent output, 25 kv., 400 $\mu a./in.^2$ | 360 |
| Color | Blue |

Example III.—Calcium Aluminosilicates: RO=CaO

The base glass used in this series of runs had the following composition:

| Component: | Parts by Weight |
|---|---|
| $SiO_2$ | 61.0 |
| $Al_2O_3$ | 18.5 |
| CaO | 20.5 |

Varying amounts of CuO, illustrating the range of the present invention, were added to the base glass position to provide the luminescent output results shown hereinafter. Each of the glasses 19 to 22 was melted at a temperature of about 2900° F. and was maintained at such melting temperature until all of the ingredients had gone into solution and there resulted a substantially homogeneous bubble free glass. Each glass was then rapidly cooled so as to prevent crystallization by pouring the melt onto a cold iron slab. Each resulting cooled glass was then annealed at about 1450° F. to relieve stress.

| Glass No.: | Parts, CuO | Luminescent output, 20 kv., 200 $\mu a./in.^2$ | Luminescent output, 25 kv., 400 $\mu a./in.^2$ | Color |
|---|---|---|---|---|
| 19 | 0.25 | 143 | 392 | Blue. |
| 20 | 0.20 | 102 | | Do. |
| 21 | 0.30 | 118 | | Do. |
| 22 | 0.50 | 162 | | Do. |

The base glass used in the above series of runs will be noted to have the same proportions of ingredients as the magnesium aluminosilicate compositions discussed above. It was found, however, to be somewhat higher melting. Addition of a small amount of alkali metal oxide would facilitate fusion and melting.

Example IV.—Strontium Aluminosilicates: RO=SrO

A melt was made wherein SrO was used in a glass composition otherwise equivalent to the magnesium aluminosilicate and calcium aluminosilicate glasses discussed above. The results are set forth hereinafter.

The glass was melted at a temperature of about 2900° F. and was maintained at such melting temperature until all of the ingredients had gone into solution and there resulted a substantially homogeneous bubble free glass. The glass was then rapidly cooled so as to prevent crystallization by pouring the melt onto a cold iron slab. The cooled glass was then annealed to relieve stress.

| Ingredient: | Glass No. 23, parts by weight |
|---|---|
| $SiO_2$ | 55.0 |
| $Al_2O_3$ | 15.0 |
| SrO | 30.0 |
| CuO | 0.5 |
| Luminescent output, 20 kv., 200 $\mu a./in.^2$ | 110 |
| Luminescent output, 25 kv., 400 $\mu a./in.^2$ | 294 |
| Color | Blue |

The foregoing data illustrate that a SrO glass is possible, with the same composition as the equivalent magnesium and calcium aluminosilicate glasses. The glass, however, is harder to melt at temperatures less than 2900° F. Here again, an appropriate fusion agent, such as a small amount of alkali metal oxide, lithium oxide particularly, could be used to advantage.

Example V.—Barium Aluminosilicate Glasses: RO=BaO

Two melts were made wherein BaO was used in glass compositions otherwise comprising $SiO_2$ and $Al_2O_3$. Results are set forth hereinafter.

Each of the glasses 24 and 25 was melted at a temperature of about 2900° F. and was maintained at such melting temperature until all of the ingredients had gone into solution and there resulted a substantially homogeneous, bubble free glass. Each glass was then rapidly cooled so as to prevent crystallization by pouring the melt onto a cold iron slab. Each resulting cooled glass was then annealed to relieve stress.

| | Parts by weight | |
|---|---|---|
| | Glass No. 24 | Glass No. 25 |
| Ingredient: | | |
| $SiO_2$ | 47.0 | 39.20 |
| $Al_2O_3$ | 13.0 | 10.71 |
| BaO | 40.0 | 50.00 |
| CuO | 0.5 | 0.50 |
| Luminescent output, 20 kv., 200 $\mu a./in.^2$ | 120 | 83 |
| Luminescent output, 25 kv., 400 $\mu a./in.^2$ | 205 | 140 |
| Color | Blue | Blue |

Example Va.—Barium aluminosilicate modification

The glass was melted at a temperature of about 2900° F. and was maintained at such melting temperature until all of the ingredients had gone into solution and there resulted a substantially homogeneous bubble free glass. The glass was then rapidly cooled so as to prevent crystallization by pouring the melt onto a cold iron slab. The cooled glass was then annealed to relieve stress.

| Ingredients: | Glass No. 26, parts by weight |
|---|---|
| $SiO_2$ | 55.0 |
| $Al_2O_3$ | 15.0 |
| BaO | 28.5 |
| $Li_2O$ | 1.5 |
| CuO | 0.5 |
| Luminescent output, 20 kv. 200 $\mu a./in.^2$ | 155 |
| Luminescent output, 25 kv, 400 $\mu a./in.^2$ | 320 |
| Color | Blue |

DISTINCTIONS FROM THE PRIOR ART

Glasses containing copper have been disclosed by the prior art. For example, see U.S. Letters Patents 2,097,275 and 2,099,602 issued to H. Fischer.

In these patents, alkali metal-borosilicate glasses are disclosed for cathodoluminescence. Also, the patents are concerned with a low level of iron, which is said to act as a quenching agent for cathodoluminescence. Further, the patents state that the alkaline earth metal oxides, particularly MgO, reduce the light emitted from the discharge receptacle by reduction of luminescence of the glass wall, and the said luminescence is even further reduced by an addition of CaO or $Al_2O_3$, or by an addition of both of these substances.

Copper has also been described by these patents as producing an intense afterglow, meaning an extended half life. Thus, the copper has been disclosed as being used in very small amounts.

In these patents, the glasses were specifically designed for tube drawing—meaning soft and readily formable compositions. Thus, alkali-silicate glasses were used, so that drawing would be facilitated for the production of fluorescent tubes. These composition have very poor resistance to deterioration against electron bombardment.

The foregoing conclusions have been substantiated by a series of runs wherein alkali-silicate glasses were tested for cathodoluminescence, but using CuO within the ranges of the present invention. The results of the tests with glass compositions and pertinent observations are set out in Example VI. It will be noted that the cathodoluminescent output is substantially subdued as compared to that exhibited by the glasses of the present invention, e.g. as illustrated in Examples I to Va. Likewise, the maintenance ranged from fair to poor which means that such glasses have substantially nil utility in a cathodoluminescent device.

Example VI.—Alkali glass compositions

Various prior art alkali glass compositions were prepared and activated with CuO. Each glass was maintained at a melting temperature until all of the ingredients (including the CuO) had gone into solution and there resulted a substantially homogeneous, bubble free glass. Each glass was rapidly cooled so as to prevent crystallization and then stress relieved by annealing. The following tabulation illustrates the prior art glass compositions, the amount of CuO activator, the melting temperature and the cathodoluminescent output.

|  | a | b | c | d |
|---|---|---|---|---|
| $SiO_2$ | 79.5 | 79.0 | 65.1 | 71.5 |
| $Al_2O_3$ |  | 11.2 | 9.2 | 10.1 |
| $Li_2O$ |  |  | 9.8 |  |
| $Na_2O$ | 20.5 |  |  | 18.4 |
| $K_2O$ |  |  | 25.7 |  |
| CuO | 0.50 | 0.50 | 0.50 | 0.50 |
| Melting temperature, °F | 2,700 | 2,900 | 2,900 | 2,900 |
| Luminescent output, 20 kv., 200 μa/in.[2] | 24 | 26 | 30 | 29 |
| Color | (1) | (2) | (1) | (1) |
| Maintenance | (3) | (4) | (4) | (4) |

[1] Blue-Green.  [2] Blue.  [3] Fair.  [4] Poor.

Example VII.—Zinc containing glasses

To show the effects of zinc upon cathodoluminescent output, varying amounts of ZnO were added to the following CuO activated base glass composition.

Component: Parts by weight
- $SiO_2$ ---- 61.0
- $Al_2O_3$ ---- 18.5
- CaO ---- 20.5

Each of the glasses e, f, g, and h was melted at a temperature of about 2900° F. and maintained at such melting temperature until all of the ingredients had gone into solution and there resulted a substantially homogeneous, bubble free glass. Each glass was rapidly cooled so as to prevent crystallization and then annealed to relieve stress.

|  | e | f | g | h |
|---|---|---|---|---|
| Percent, ZnO | 1 | 3 | 5 | 7 |
| Percent, CuO | .80 | .80 | .80 | .80 |
| Luminescent output, 20 kv., 200 μa./in.[2] | 100 | 53 | 34 | 26 |
| Luminescent output, 25 kv., 400 μa./in.[2] | 190 | 120 | 57 | 46 |
| Color | (1) | (1) | (1) | (1) |
| Maintenance | (3) | (2) | (3) | (3) |

[1] Blue.  [2] Good.  [3] Fair.

SUMMARY

The improvements provided by the glasses of the present invention include the following:

(1) Cathodoluminescence with higher brightness.
(2) A relatively high copper content (meaning a specific range for cathodoluminescence).
(3) Improved maintenance factor (better resistance to deterioration against electron bombardment).
(4) A blue color.
(5) Novel glass compositions that are alkaline-earth metal oxide based.
(6) Improved durability to weathering.

The foregoing discussion has been directed toward cathodoluminescence. However, it will be obvious to those skilled in the art that cathode rays fall within a broad group of high level excitation energy media. While no claims are made relative to other excitation media, such as X-rays or the like, the present invention, however, is not to be limited should it subsequently be found that these glasses inherently possess sensitivity other than those disclosed.

It will be evident that modifications of this invention can be made without departing from the spirit and scope of this disclosure or the scope of the following claims.

We claim:

1. A cathodoluminescent glass consisting essentially of the following ingredients and having a compositional analysis within the following range and with all ingredients in solution in the glassy phase:

| Ingredient: | Weight percent |
|---|---|
| $SiO_2$ | 35–70 |
| $Al_2O_3$ | 8–25 |
| RO (MgO, CaO, SrO, BaO) | 15–50 |
| $R_2O$ ($Li_2O$, $Na_2O$, $K_2O$, $Rb_2O_3$, $Cs_2O$) | 0.1–5.0 |
| CuO | 0.2–1.0 |

2. A cathodoluminescent glass consisting essentially of the following ingredients and having a compositional analysis within the following range and with all ingredients in solution in the glassy phase:

| Ingredient: | Weight percent parts by weight |
|---|---|
| $SiO_2$ | 40–60 |
| $Al_2O_3$ | 15–20 |
| RO (MgO, CaO, SrO, BaO) | 18–30 |
| $R_2O$ ($Li_2O$, $Na_2O$, $K_2O$, $Rb_2O$, $Cs_2O$) | 0.1–3.0 |
| CuO | 0.5–0.8 |

3. A cathodoluminescent glass consisting essentially of the following ingredients and containing the following ingredients within the ranges indicated and with all ingredients in solution in the glassy phase:

| Component: | Weight percent parts by weight |
|---|---|
| $SiO_2$ | 35–70 |
| $Al_2O_3$ | 8–25 |
| RO (MgO, CaO, SrO, BaO) | 15–50 |
| CuO | 0.2–1.0 |

4. The cathodoluminescent glass of claim 3 wherein said glass is a magnesium aluminosilicate glass consisting essentially of the following ingredients in the amounts indicated and with all ingredients in solution in the glassy phase:

| Component: | Weight percent parts by weight |
|---|---|
| $SiO_2$ | 61.0 |
| $Al_2O_3$ | 18.5 |
| MgO | 20.5 |
| CuO | 0.2–0.51 |

5. The cathodoluminescent glass of claim 1 wherein said glass is a magnesium aluminosilicate glass consisting essentially of the following ingredients in the amounts indicated and with all ingredients in solution in the glassy phase:

| Component: | Weight percent parts by weight |
|---|---|
| $SiO_2$ | 61.0 |
| $Al_2O_3$ | 18.5 |
| MgO | 20.5 |
| $R_2O$ ($Li_2O$, $Na_2O$, $K_2O$, $Rb_2O$, $Cs_2O$) | 0.1–5.0 |
| CuO | 0.4–0.5 |

6. The cathodoluminescent glass of claim 3 wherein said glass is a calcium-magnesium aluminosilicate glass consisting essentially of the following ingredients within the ranges indicated and with all ingredients in solution in the glassy phase:

| Component: | Weight percent parts by weight |
|---|---|
| $SiO_2$ | 58.0–60.4 |
| $Al_2O_3$ | 17.9–18.3 |
| MgO | 9.7–16.8 |
| CaO | 4.5–13.5 |
| CuO | 0.5 |

7. The cathodoluminescent glass of claim 1 wherein said glass is a calcium-magnesium aluminosilicate glass consisting essentially of the following ingredients in the amounts indicated and with all ingredients in solution in the glassy phase:

| Component: | Weight percent parts by weight |
|---|---|
| $SiO_2$ | 63.6 |
| $Al_2O_3$ | 12.8 |
| CaO | 12.8 |
| MgO | 7.4 |
| $Na_2O$ | 4.1 |
| $K_2O$ | 0.1 |
| CuO | 0.5 |

8. The cathodoluminescent glass of claim 3 wherein said glass is a calcium aluminosilicate glass consisting essentially of the following ingredients in the amounts indicated and with all ingredients in solution in the glassy phase:

| Component: | Weight percent parts by weight |
|---|---|
| $SiO_2$ | 61.0 |
| $Al_2O_3$ | 18.5 |
| CaO | 20.5 |
| CuO | 0.2–0.5 |

9. The cathodoluminescent glass of claim 3 wherein said glass is a strontium aluminosilicate glass consisting essentially of the following ingredients in the amounts indicated and with all ingredients in solution in the glassy phase:

| Component: | Weight percent parts by weight |
|---|---|
| $SiO_2$ | 55.0 |
| $Al_2O_3$ | 15.0 |
| SrO | 30.0 |
| CuO | 0.5 |

10. The cathodoluminescent glass of claim 3 wherein said glass is a barium aluminosilicate glass consisting essentially of the following ingredients in the range indicated and with all ingredients in solution in the glassy phase:

| Component: | Weight percent parts by weight |
|---|---|
| $SiO_2$ | 39.2–61.0 |
| $Al_2O_3$ | 10.71–18.5 |
| BaO | 20.5–50.0 |
| CuO | 0.25–0.50 |

11. The cathodoluminescent glass of claim 1 wherein said glass is a barium aluminosilicate glass consisting essentially of the following ingredients in the amounts indicated and with all ingredients in solution in the glassy phase:

| Component: | Weight percent parts by weight |
|---|---|
| $SiO_2$ | 55.0 |
| $Al_2O_3$ | 15.0 |
| BaO | 28.5 |
| $Li_2O$ | 1.5 |
| CuO | 0.5 |

12. In a cathodoluminescent device having a source of cathode rays and a target for conversion of said rays into luminescent emissions, the improvement wherein said target is a glass consisting essentially of the following ingredients in the range indicated and with all ingredients in solution in the glassy phase:

| Component: | Weight percent |
|---|---|
| $SiO_2$ | 35–70 |
| $Al_2O_3$ | 8–25 |
| RO (MgO, CaO, SrO, BaO) | 15–50 |
| $R_2O$ ($Li_2O$, $Na_2O$, $K_2O$, $Rb_2O$, $Cs_2O$) | 0.1–5.0 |
| CuO | 0.2–1.0 |

13. In a cathode-ray tube including a faceplate, the improvement wherein the faceplate is a glass consisting essentially of the following ingredients within the ranges indicated and with all ingredients in solution in the glassy phase:

| Component: | Weight percent |
|---|---|
| $SiO_2$ | 35–70 |
| $Al_2O_3$ | 8–25 |
| RO (MgO, CaO, SrO, BaO) | 15–50 |
| CuO | 0.2–1.0 |

References Cited

UNITED STATES PATENTS

| 2,049,765 | 8/1936 | Fischer | 252—301.4 |
| 2,097,275 | 10/1937 | Fischer | 252—301.4 |
| 2,099,602 | 11/1937 | Fischer | 252—301.4 |
| 2,219,895 | 10/1940 | Hänlein | 252—301.4 |
| 2,270,124 | 1/1942 | Hüniger | 252—301.4 |
| 2,440,048 | 4/1948 | Hood | 252—301.4 |

OTHER REFERENCES

Claffy et al.: Copper Activated Aluminosilicate Phosphors, Journal of Electrochemical Society, vol. 98, No. 10, Oct. 15, 1951, pp. 409–13.

TOBIAS E. LEVOW, Primary Examiner

R. D. EDMONDS, Assistant Examiner

U.S. Cl. X.R.

252—301.4